(12) United States Patent
Wu et al.

(10) Patent No.: US 10,309,673 B2
(45) Date of Patent: Jun. 4, 2019

(54) AIR ANOMALY ALARMING METHOD, DEVICE AND STORAGE MEDIUM (71) Applicant: Beijing Xiaomi Mobile Software Co., Ltd., Haidian District, Beijing (CN)

(72) Inventors: Ke Wu, Beijing (CN); Chuangqi Li, Beijing (CN); Huayijun Liu, Beijing (CN)

(73) Assignee: BEIJING XIAOMI MOBILE SOFTWARE CO., LTD., Haidian District, Beijing (CN)

( * ) Notice: Subject to any disclaimer, the term of this patent is extended or adjusted under 35 U.S.C. 154(b) by 114 days.

(21) Appl. No.: 15/464,363

(22) Filed: Mar. 21, 2017

(65) Prior Publication Data
US 2017/0299213 A1    Oct. 19, 2017

(30) Foreign Application Priority Data
Apr. 19, 2016    (CN) .......................... 2016 1 0245252

(51) Int. Cl.
*F24F 11/30*    (2018.01)
*G08B 21/12*    (2006.01)
(Continued)

(52) U.S. Cl.
CPC ............ *F24F 11/30* (2018.01); *G05B 19/048* (2013.01); *G08B 21/12* (2013.01); *F24F 11/63* (2018.01);
(Continued)

(58) Field of Classification Search
CPC .. F24F 11/30; F24F 11/63; F24F 11/64; F24F 2110/50; F24F 2110/52; G05B 19/048; G05B 2219/2614; G08B 21/12
See application file for complete search history.

(56) References Cited

U.S. PATENT DOCUMENTS 6,711,470 B1 * 3/2004 Hartenstein .............. F24F 11/30
   700/276
8,988,232 B1    3/2015 Sloo et al.
(Continued)

FOREIGN PATENT DOCUMENTS

CN    1719360 A    1/2006
CN    2790064 Y    6/2006
(Continued)

OTHER PUBLICATIONS

Extended European Search Report in European application No. 16207171.6, dated Jun. 28, 2017.
(Continued)

*Primary Examiner* — Christopher E. Everett
(74) *Attorney, Agent, or Firm* — Jun He Law Offices P.C.; James J. Zhu (57) ABSTRACT An air anomaly alarming method, an air anomaly alarming device and a storage medium are provided. The method includes: air composition information of an indoor environment is acquired; the air composition information of the indoor environment is compared with corresponding air composition information in a pre-acquired air change pattern; and an alarming message is sent to preset target equipment when a difference between the air composition information of the indoor environment and the corresponding air composition information in the air change pattern is greater than a first preset air threshold value.

16 Claims, 9 Drawing Sheets (51) Int. Cl.
*G05B 19/048* (2006.01)
*F24F 11/63* (2018.01)
*F24F 110/50* (2018.01)
*F24F 11/64* (2018.01)
*F24F 110/52* (2018.01)

(52) U.S. Cl.
CPC ........... *F24F 11/64* (2018.01); *F24F 2110/50* (2018.01); *F24F 2110/52* (2018.01); *G05B 2219/2614* (2013.01)

(56) References Cited

U.S. PATENT DOCUMENTS

| | | | |
|---|---|---|---|
| 9,280,884 B1* | 3/2016 | Schultz | G08B 19/00 |
| 2002/0144537 A1* | 10/2002 | Sharp | G01N 1/26 |
| | | | 73/31.01 |
| 2006/0217934 A1* | 9/2006 | Armstrong | G05D 22/02 |
| | | | 702/188 |
| 2006/0234621 A1* | 10/2006 | Desrochers | F24F 3/044 |
| | | | 454/239 |
| 2009/0265037 A1 | 10/2009 | Bassa | |
| 2010/0225493 A1 | 9/2010 | Zishaan | |
| 2011/0168793 A1* | 7/2011 | Kreft | F24F 3/14 |
| | | | 236/44 C |
| 2012/0150353 A1 | 6/2012 | Bassa | |
| 2014/0260692 A1 | 9/2014 | Sharp | |
| 2015/0013958 A1* | 1/2015 | Kubo | F24D 15/04 |
| | | | 165/237 |
| 2015/0077737 A1 | 3/2015 | Belinsky et al. | |
| 2015/0096352 A1 | 4/2015 | Peterson et al. | |
| 2015/0097663 A1 | 4/2015 | Sloo et al. | |
| 2015/0097665 A1 | 4/2015 | Sloo et al. | |
| 2015/0097666 A1 | 4/2015 | Boyd et al. | |
| 2015/0097680 A1 | 4/2015 | Fadell et al. | |
| 2015/0097681 A1 | 4/2015 | Fadell et al. | |
| 2015/0097682 A1 | 4/2015 | Rossi et al. | |
| 2015/0097683 A1 | 4/2015 | Sloo et al. | |
| 2015/0097684 A1* | 4/2015 | Sloo | F24F 11/30 |
| | | | 340/628 |
| 2015/0097685 A1 | 4/2015 | Sloo et al. | |
| 2015/0097686 A1 | 4/2015 | Fadell et al. | |
| 2015/0097687 A1 | 4/2015 | Sloo et al. | |
| 2015/0097688 A1 | 4/2015 | Bruck et al. | |
| 2015/0100167 A1 | 4/2015 | Sloo et al. | |
| 2015/0154848 A1 | 6/2015 | Sloo et al. | |
| 2015/0187200 A1 | 7/2015 | Fadell et al. | |
| 2015/0254970 A1 | 9/2015 | Sloo et al. | |
| 2015/0323427 A1 | 11/2015 | Sharp | |
| 2016/0066067 A1* | 3/2016 | Schultz | H04Q 9/00 |
| | | | 340/870.07 |
| 2016/0066068 A1* | 3/2016 | Schultz | H04Q 9/00 |
| | | | 340/870.07 |
| 2016/0078751 A1 | 3/2016 | Sloo et al. | |
| 2016/0104366 A1 | 4/2016 | Sloo et al. | |
| 2016/0125730 A1 | 5/2016 | Sloo et al. | |
| 2016/0232779 A1 | 8/2016 | Sloo et al. | |
| 2016/0335884 A1 | 11/2016 | Fadell et al. | |
| 2016/0371969 A1 | 12/2016 | Rossi et al. | |
| 2017/0092115 A1 | 3/2017 | Sloo et al. | |
| 2017/0162007 A1 | 6/2017 | Boyd et al. | |

FOREIGN PATENT DOCUMENTS

| | | |
|---|---|---|
| CN | 104267090 A | 1/2015 |
| CN | 104637230 A | 5/2015 |
| CN | 204759128 U | 11/2015 |
| CN | 105258281 A | 1/2016 |
| CN | 205016036 U | 2/2016 |
| CN | 105488965 A | 4/2016 |
| CN | 105701952 A | 6/2016 |
| DE | 102004034904 A1 | 4/2006 |
| EP | 3030879 A1 | 6/2016 |
| JP | 2008225857 A | 9/2008 |
| WO | 2007096865 A2 | 8/2007 |
| WO | 2014203070 A1 | 12/2014 |
| WO | 2015021428 A1 | 2/2015 |
| WO | 2015054288 A1 | 4/2015 |

OTHER PUBLICATIONS

First Office Action of Chinese application No. 201610245252.X, dated Jul. 24, 2017.
International Search Report in international application No. PCT/CN2016/097029, dated Jan. 23, 2017.

* cited by examiner

AIR ANOMALY ALARMING METHOD, DEVICE AND STORAGE MEDIUM

CROSS-REFERENCE TO RELATED APPLICATIONS

This application is filed based upon and claims priority to Chinese Patent Application No. 201610245252.X, filed on Apr. 19, 2016, the entire contents of which are incorporated herein by reference.

TECHNICAL FIELD

The present disclosure generally relates to the field of computer processing, and more particularly, to an air anomaly alarming method, device and storage medium.

BACKGROUND

Houses are places for people to rest in, and are also safe places for people. Indoor safety of houses is very important for people's lives. A dangerous condition such as a fire may occur in a house, and if an alarm may be timely given, personal casualties and property loss may be reduced. Some equipment adopts a single fixed threshold value for alarm monitoring, the threshold value is proper in some scenarios, but in some scenarios, it may not be proper and easily cause the condition that an alarm is falsely given or not given.

SUMMARY

According to a first aspect of the embodiment of the present disclosure, there is provided an air anomaly alarming method. The method includes: acquiring air composition information of an indoor environment; comparing the air composition information of the indoor environment with corresponding air composition information in a pre-acquired air change pattern; and sending an alarming message to preset target equipment when a difference between the air composition information of the indoor environment and the corresponding air composition information in the air change pattern is greater than a first preset air threshold value.

According to a second aspect of the embodiment of the present disclosure, there is provided an air anomaly alarming device. The device includes: a processor; and a memory configured to store instructions executable by the processor, wherein the processor may be configured to: acquire air composition information of an indoor environment; compare the air composition information of the indoor environment with corresponding air composition information in a pre-acquired air change pattern; and send an alarming message to preset target equipment when a difference between the air composition information of the indoor environment and the corresponding air composition information in the air change pattern is greater than a first preset air threshold value.

According to a third aspect of the embodiment of the disclosure, there is provided a non-transitory computer-readable storage medium having stored therein instructions that, when executed by a processor, causes the processor to perform an air anomaly alarming method, the method including: acquiring air composition information of an indoor environment; comparing the air composition information of the indoor environment with corresponding air composition information in a pre-acquired air change pattern; and sending an alarming message to preset target equipment when a difference between the air composition information of the indoor environment and the corresponding air composition information in the air change pattern is more than a first preset air threshold value.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the specification, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with some aspects related to the present disclosure as recited in the appended claims.

Typically, equipment such as a mobile terminal or an air purifier may monitor air quality in terms of PM2.5 and the like in an indoor environment. When an air quality value is greater than a preset threshold value, an alarming signal is sent, wherein the preset threshold value is usually singular and fixed. For example, the air quality value of the indoor environment usually may not exceed the threshold value. If a user cooks in a kitchen or multiple users simultaneously smoke indoors, the air quality value of the indoor environment may exceed the threshold value, and the air purifier may give an alarm. However, it is inappropriate to give the alarm at this moment because such air quality standard exceeding is not caused by a disaster such as a fire but is caused by a normal behavior of the user.

To avoid the above inappropriate alarm, indoor air composition information is monitored for a certain period of time to generate an air change pattern according to embodiments of the present disclosure. Daily indoor air quality is monitored according to the air change pattern, and when the air quality is obviously inconsistent with the pattern, an alarming message is sent to make the alarm more accurate and timely.

Figure 1:
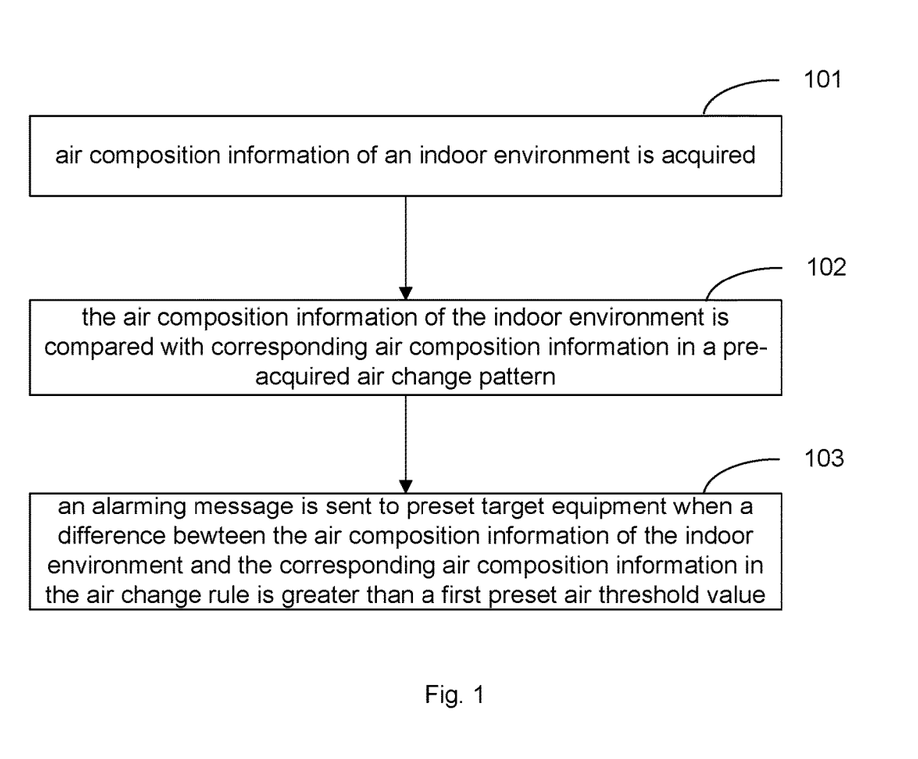
FIG. 1 is a flow chart showing an air anomaly alarming method according to an exemplary embodiment.

FIG. 1 is a flow chart showing an air anomaly alarming method according to an exemplary embodiment, and as shown in FIG. 1, the method may be implemented by equipment such as an air purifier, and includes the following steps.

Step 101: air composition information of an indoor environment is acquired.

Step 102: the air composition information of the indoor environment is compared with corresponding air composition information in a pre-acquired air change pattern.

Step 103: an alarming message is sent to preset target equipment when a difference between the air composition information of the indoor environment and the corresponding air composition information in the air change pattern is greater than a first preset air threshold value.

When the difference between the air composition information of the indoor environment and the corresponding air composition information in the air change pattern is not greater than the first preset air threshold value, the flow is ended, and Step 101 may be continued.

The air composition information may be air composition information of harmful air, and when the air composition information of the indoor environment is greater than the corresponding air composition information in the air change pattern and the difference is greater than the first preset air threshold value, the alarming message is sent to the preset target equipment. When the air composition information of the indoor environment is not greater than the corresponding air composition information in the air change pattern, the flow is ended, and Step 101 may be continued.

The air composition information may be air composition information of beneficial air, and when the air composition information of the indoor environment is lower than the corresponding air composition information in the air change pattern and an absolute value of the difference is greater than the first preset air threshold value, the alarming message is sent to the preset target equipment. When the air composition information of the indoor environment is not lower than the corresponding air composition information in the air change pattern, the flow is ended, and Step 101 may be continued.

In the embodiment, the air purifier has a sensor configured for air detection, and may perform air detection on the surrounding indoor environment to acquire the air composition information of the indoor environment. The air composition information includes PM2.5 (fine particulate matters, referring to particulate matters whose aerodynamic equivalent diameters are less than or equal to 2.5 microns), PM10, carbon dioxides, carbon monoxides and the like. The air composition information may be a specific content value, or may also be a percentage of a composition. The air purifier compares currently detected air composition information with the pre-acquired air change pattern. The air change pattern is a set of air composition information changing with time. A one-week change pattern is taken as an example. When current detection time is 7 P.M. on Wednesday, current air composition information is compared with air composition information at 7 P.M. on Wednesday in the air change pattern. If the current air composition information is obviously greater than the corresponding air composition information in the air change pattern, an air anomaly is determined, and an alarm is required to be given. The condition that the air composition information is PM2.5 is taken as an example. For example, current PM2.5 is 200, corresponding PM2.5 in the air change pattern is 100, and a difference between them is 100, which is greater than a first air threshold value 50. At this moment, the air anomaly is determined, and the alarm is required to be given.

For example, the air purifier is positioned in a kitchen. There is no cooking in a house from 0:00 to 18:00, and PM2.5 in the air is 50. A user cooks in the kitchen from 18:00 to 19:00, and the PM2.5 in the air is 100. The PM2.5 in the air is 50 from 19:00 to 24:00. Then, from 0:00 to 18:00, the air purifier is required to give an alarm when monitoring that current PM2.5 is 100. From 18:00 to 19:00, the air purifier is required to give an alarm when monitoring that current PM2.5 is 150, but is not required to give an alarm when the PM2.5 is 100. Compared with adoption of a singular and fixed threshold value, adoption of the air change pattern for monitoring whether the air of the indoor environment is abnormal in the embodiment may make determination more accurate.

The preset target equipment may be a pre-bound mobile terminal or wearable equipment, and may also be preset residential monitoring equipment and the like.

In an embodiment, the method further includes: Step A1 and Step A2.

Step A1: air composition information of the indoor environment is continuously monitored within a preset time period; and Step A2: the air change pattern is generated according to the continuously monitored air composition information of the indoor environment.

In the embodiment, the air composition information of the surrounding environment is monitored within the preset time period to generate the air change pattern to provide a determination basis for subsequent alarming and monitoring.

For example, there is no data in a new air purifier, and then air composition information of the indoor environment may be continuously monitored within a first week or month (preset time period) to generate an air change pattern. No alarms may be given in this time period. Or, a preset fixed threshold value is adopted to determine whether to give an alarm in this time period. After the air change pattern is generated, whether the air is abnormal may be accurately determined. The air change pattern is continuously updated in subsequent air detection.

In an embodiment, Step A1 includes: Step A11 and Step A12.

Step A11: own position change information is monitored; and

Step A12: the air composition information of the indoor environment is continuously monitored within the preset time period when the own position change information is greater than a preset distance threshold value.

In the embodiment, the user may move the air purifier from the kitchen to a living room. Environments of the kitchen and the living room are different, and an air change pattern of the kitchen is inapplicable to the living room. Therefore, the air purifier re-monitors air composition information of the indoor environment and generates an air change pattern after being moved to the living room.

Multiple implementation manners may be adopted for Step A11. For example, the air purifier has a gyroscope to calculate its own movement distance. In another example, the air purifier is wirelessly connected with an indoor router, and calculates a distance with the router according to an attenuation degree and an angle of a wireless signal, thereby determining a position change. Other manners which can be adopted to obtain the position change information are all applicable to the embodiment.

The distance threshold value may be determined according to a practical requirement, for example, 3 meters.

According to the embodiment, the air change pattern may be automatically updated to adapt to air monitoring of a new environment according to the position change, thereby making accurate air anomaly monitoring.

In an embodiment, the method further includes: Step B1 and Step B2.

Step B1: air composition information of an outdoor environment is acquired.

Step B2: the air composition information of the indoor environment is compared with the air composition information of the outdoor environment.

Step 103 includes Step B3.

Step B3: the alarming message is sent to the preset target equipment when the difference between the air composition information of the indoor environment and the corresponding air composition information in the air change pattern is greater than the first preset air threshold value and a difference between the air composition information of the indoor environment and the air composition information of the outdoor environment is greater than a second preset air threshold value.

In the embodiment, if outdoor PM2.5 is very high, for example, 300, the indoor PM2.5 may also be influenced. At this moment, the indoor PM2.5 is increased not because of a dangerous condition such as a fire but because of influence of outdoor weather, and it is inappropriate to give an alarm. Therefore, the air composition information of the outdoor environment is also acquired, and both an outdoor factor and an indoor factor are taken into consideration in the embodiment. When the indoor air composition information is obviously greater than the corresponding air composition information in the air change pattern and is also obviously greater than the outdoor air composition information, the indoor air anomaly is determined, and an alarm is given. The alarm given at this moment is more accurate. If the indoor air composition information is obviously greater than the corresponding air composition information in the air change pattern but is not obviously greater than the outdoor air composition information, it is determined that the indoor air anomaly is caused by influence of the outdoor air and no alarms may be given. If the indoor air composition information is not obviously greater than the corresponding air composition information in the air change pattern but is obviously greater than the outdoor air composition information, it is determined that the indoor air anomaly is caused by a living habit of the user and no alarms may be given.

The first air threshold value and the second air threshold value have no fixed magnitude relationship, and may be the same or different.

In an embodiment, the air composition information of the indoor environment includes at least two types of air composition information.

Step 103 includes Step C1.

Step C1: when a difference between at least one type of air composition information of the indoor environment and the corresponding air composition information in the air change pattern is greater than the first preset air threshold value, the alarming message is sent to preset target equipment corresponding to the at least one type of air composition information.

In the embodiment, the air composition information includes information about PM2.5, PM10, carbon dioxides, carbon monoxides and the like. Different air composition information may correspond to different first air threshold values. That is, there may be multiple first air threshold values.

If the PM2.5 or the PM10 exceeds a standard, a manner of starting purification equipment, starting fire extinguishing equipment, opening a window for ventilation or the like may be adopted. If the carbon dioxides or the carbon monoxides exceed a standard, a manner of cutting off gas, opening the window for ventilation or the like may be adopted. Therefore, for different air composition information exceeding standards, causes for the problem and manners for solving the problem are different, and corresponding target equipment may also be different. In the embodiment, the air composition information may be subdivided, and it may be checked which air composition information exceeds the standard, so as to send the alarming message more pertinently and solve the problem more accurately.

At least one type of air composition information in various types of air composition information, such as information of the PM2.5, the PM10, the carbon dioxides and the carbon monoxides, is greater than the corresponding air change pattern and the difference is greater than the corresponding first air threshold value, and then an alarm may be given.

For example, target equipment corresponding to the PM2.5 and the PM10 includes: a mobile terminal, a residential property monitoring system, a camera, a window sensor, a fire extinguisher and the like. Target equipment corresponding to the carbon dioxides and the carbon monoxides includes: a mobile terminal, a residential property monitoring system, a camera, a window sensor, a gas alarm and the like.

The alarming message may be timely sent to the mobile terminal to timely prompt the user. The alarming message may be timely sent to the residential property monitoring system to timely notify a property management employee to check a site. The alarming message may be timely sent to the camera to timely control the camera to shoot a site picture for related personnel to know a site condition. The alarming message may be timely sent to equipment such as the window sensor and the gas alarm to timely control these equipment to take corresponding measures to reduce loss as much as possible.

The user may configure required target equipment according to a practical requirement. The air purifier may be directly configured, and the air purifier may also be configured on the pre-bound mobile terminal.

In an embodiment, the alarming message may include local position information.

According to the embodiment, a position where the anomaly occurs may be accurately determined according to the position information, so that related personnel may conveniently rush to the site and conveniently and accurately control the related target equipment to take accurate rescue measures.

For example, the air purifier in the kitchen monitors the air anomaly in the kitchen, gives an alarm and sends alarming information to the window sensor of the kitchen to open a window of the kitchen. Compared with opening other windows, opening the window of the kitchen may achieve a better effect.

An air anomaly alarming implementation process will be introduced below with some embodiments in detail.

Figure 2:
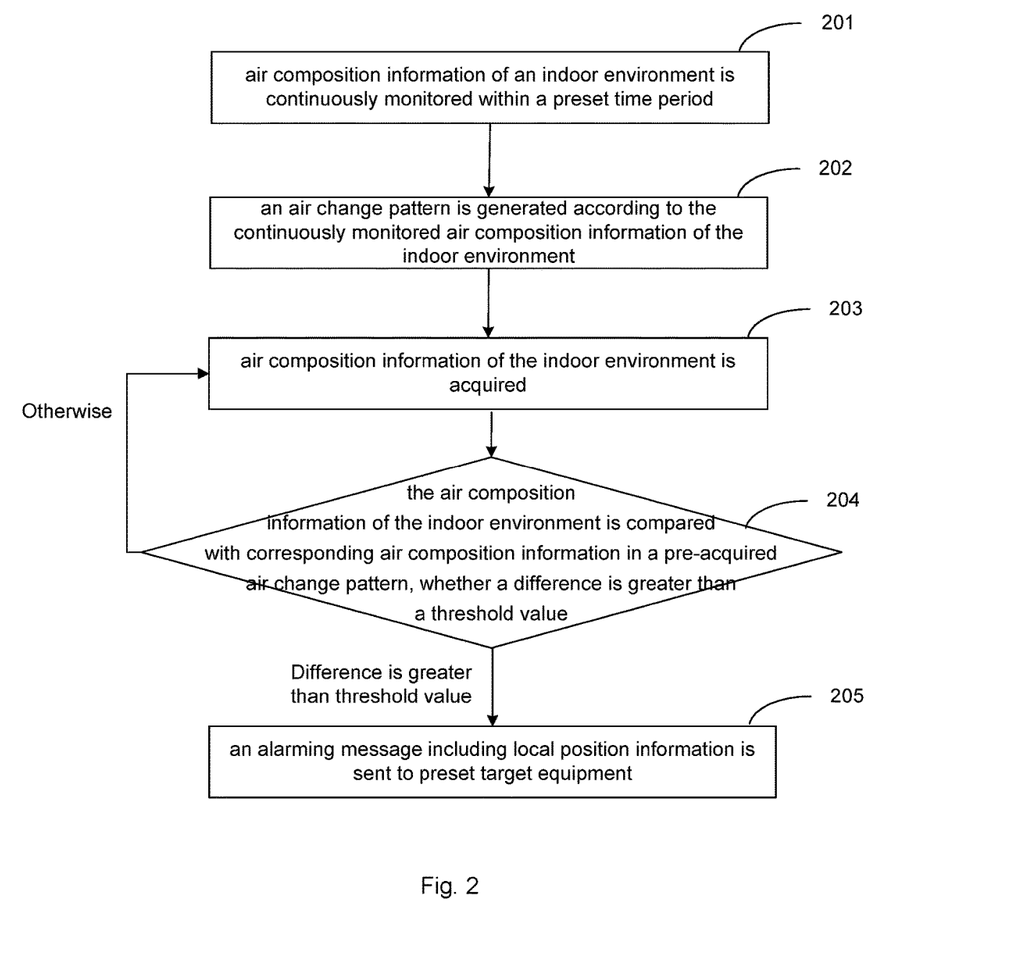
FIG. 2 is a flow chart showing an air anomaly alarming method according to another exemplary embodiment.

FIG. 2 is a flow chart showing an air anomaly alarming method according to an exemplary embodiment, and as shown in FIG. 2, the method may be implemented by equipment such as an air purifier, and includes the following steps.

Step 201: air composition information of an indoor environment is continuously monitored within a preset time period.

Step 202: an air change pattern is generated according to the continuously monitored air composition information of the indoor environment.

Step 203: air composition information of the indoor environment is acquired.

The air change pattern may also be updated according to the air composition information.

Step 204: the air composition information of the indoor environment is compared with corresponding air composition information in the pre-acquired air change pattern, Step 205 is continued when a difference between the air composition information of the indoor environment and the corresponding air composition information in the air change pattern is greater than a first preset air threshold value, otherwise Step 203 is continued.

Step 205: an alarming message including local position information is sent to preset target equipment.

Figure 3:
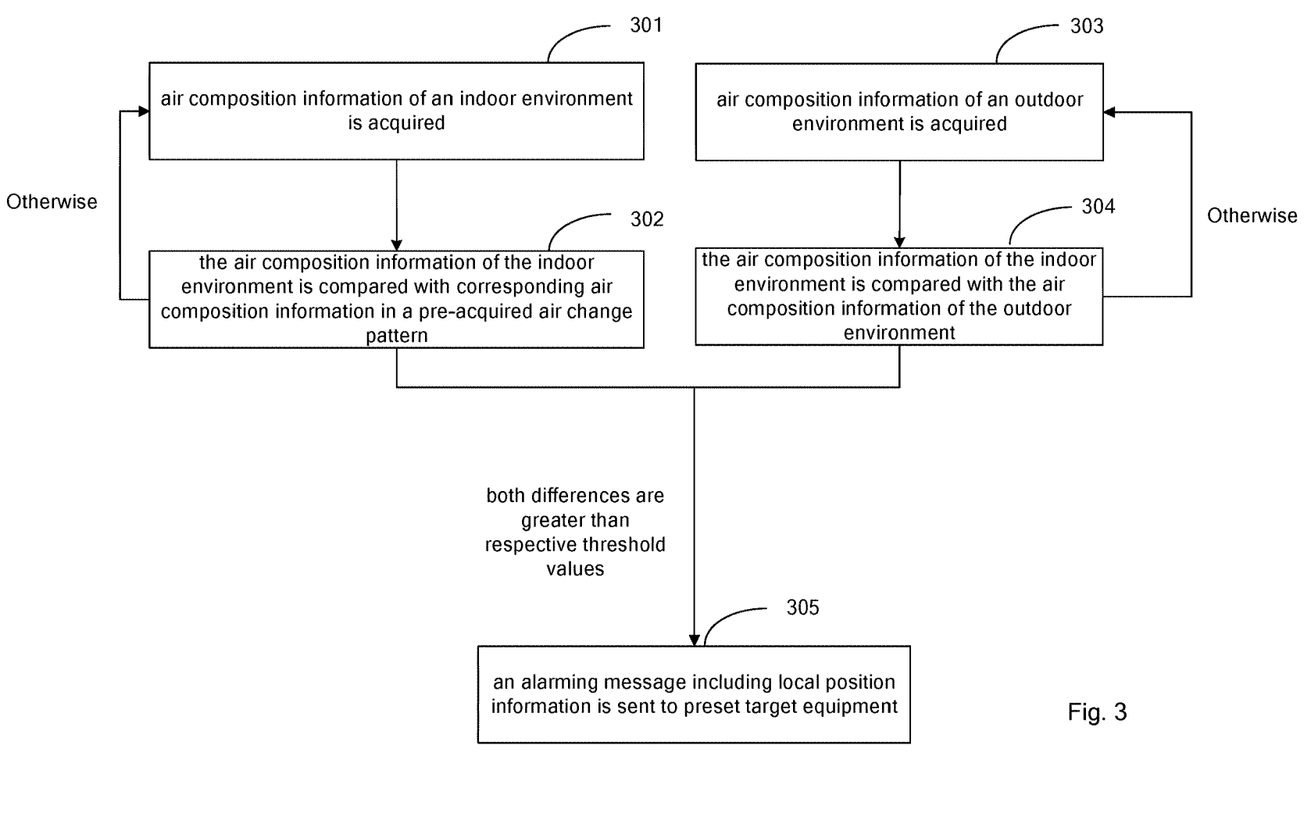
FIG. 3 is a flow chart showing an air anomaly alarming method according to yet another exemplary embodiment.

FIG. 3 is a flow chart showing an air anomaly alarming method according to an exemplary embodiment, and as shown in FIG. 3, the method may be implemented by equipment such as an air purifier, and includes the following steps.

Step 301: air composition information of an indoor environment is acquired.

Step 302: the air composition information of the indoor environment is compared with corresponding air composition information in a pre-acquired air change pattern.

Step 303: air composition information of an outdoor environment is acquired.

Step 304: the air composition information of the indoor environment is compared with the air composition information of the outdoor environment.

Wherein, Step 301 and Step 302 are independent from Step 303 and Step 304, and there steps may be executed without a fixed sequence.

When a difference between the air composition information of the indoor environment and the corresponding air composition information in the air change pattern is greater than a first preset air threshold value and a difference between the air composition information of the indoor environment and the air composition information of the outdoor environment is greater than a second preset air threshold value, Step 305 is continued, otherwise Step 301 is continued.

Step 305: an alarming message including local position information is sent to preset target equipment.

Figure 4:
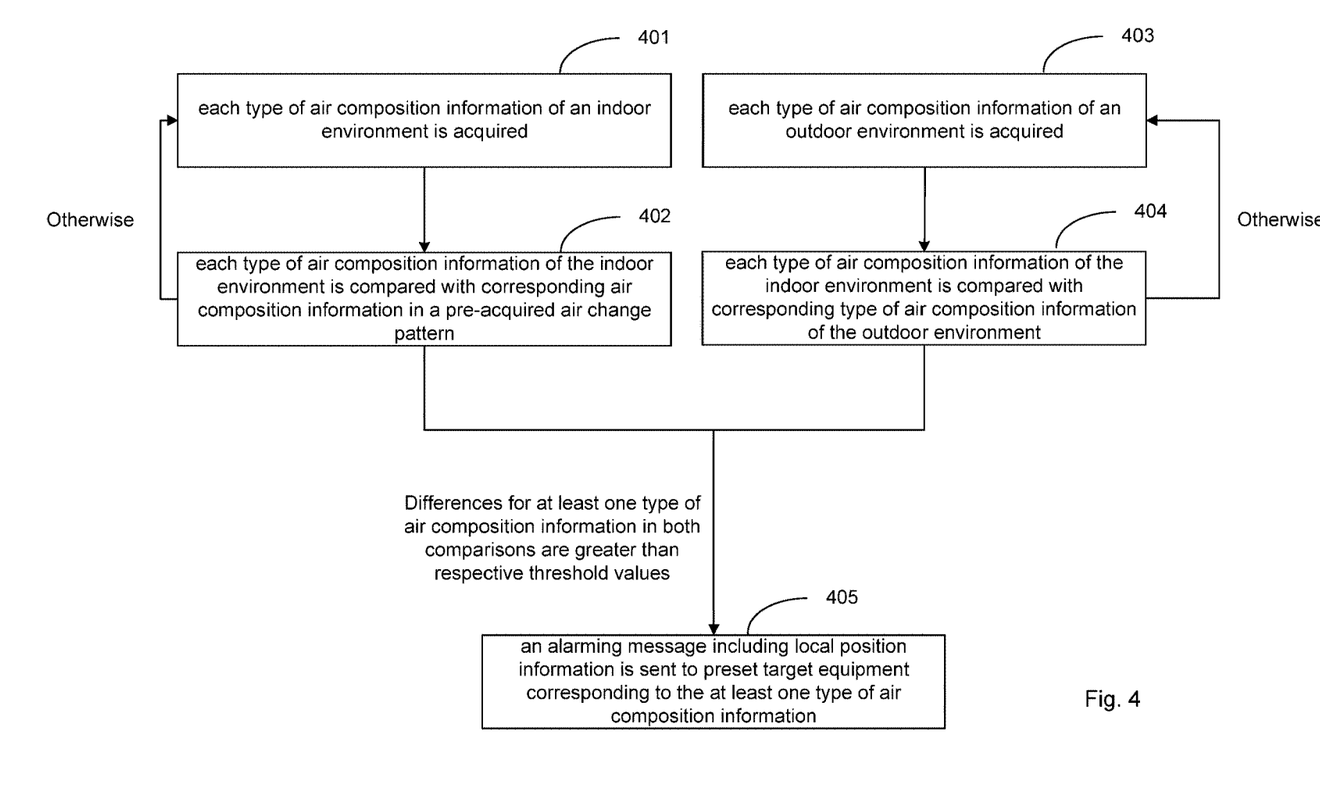
FIG. 4 is a flow chart showing an air anomaly alarming method according to still another exemplary embodiment.

FIG. 4 is a flow chart showing an air anomaly alarming method according to an exemplary embodiment, and as shown in FIG. 4, the method may be implemented by equipment such as an air purifier, and includes the following steps.

Step 401: each type of air composition information of an indoor environment is acquired.

Step 402: each type of air composition information of the indoor environment is compared with corresponding air composition information in a pre-acquired air change pattern.

Step 403: each type of air composition information of an outdoor environment is acquired.

Step 404: each type of air composition information of the indoor environment is correspondingly compared with each type of air composition information of the outdoor environment.

Wherein, Step 401 and Step 402 are independent from Step 403 and Step 404, and there steps may be executed without a fixed sequence.

When a difference between at least one type of air composition information of the indoor environment and the corresponding air composition information in the air change pattern is greater than a first preset air threshold value and a difference between at least one type of air composition information of the indoor environment and the corresponding air composition information of the outdoor environment is greater than a second preset air threshold value, Step 405 is continued, otherwise Step 401 is continued.

Step 405: an alarming message including local position information is sent to preset target equipment corresponding to the at least one type of air composition information.

The air anomaly alarming implementation process is introduced above, the process is implemented by a mobile terminal and a computer, and internal structures and functions of the two types of equipment are introduced below respectively.

Figure 5:
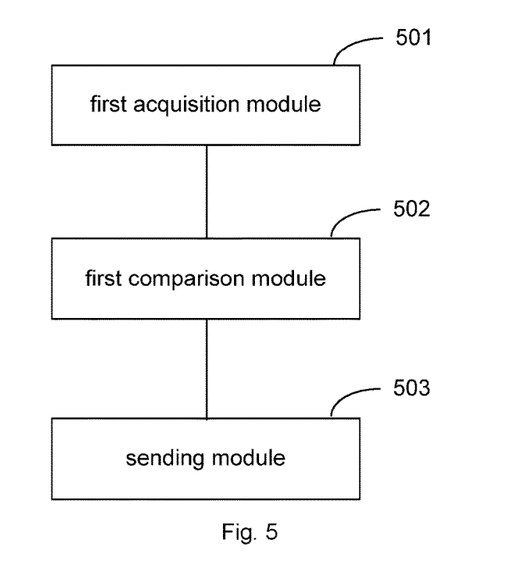
FIG. 5 is a block diagram of an air anomaly alarming device according to an exemplary embodiment.

FIG. 5 is a diagram of an air anomaly alarming device according to an exemplary embodiment. Referring to FIG. 5, the device includes: a first acquisition module 501, a first comparison module 502 and a sending module 503.

The first acquisition module 501 is configured to acquire air composition information of an indoor environment.

The first comparison module 502 is configured to compare the air composition information of the indoor environment with corresponding air composition information in a pre-acquired air change pattern.

The sending module 503 is configured to send an alarming message to preset target equipment when a difference between the air composition information of the indoor environment and the corresponding air composition information in the air change pattern is greater than a first preset air threshold value.

Figure 6:
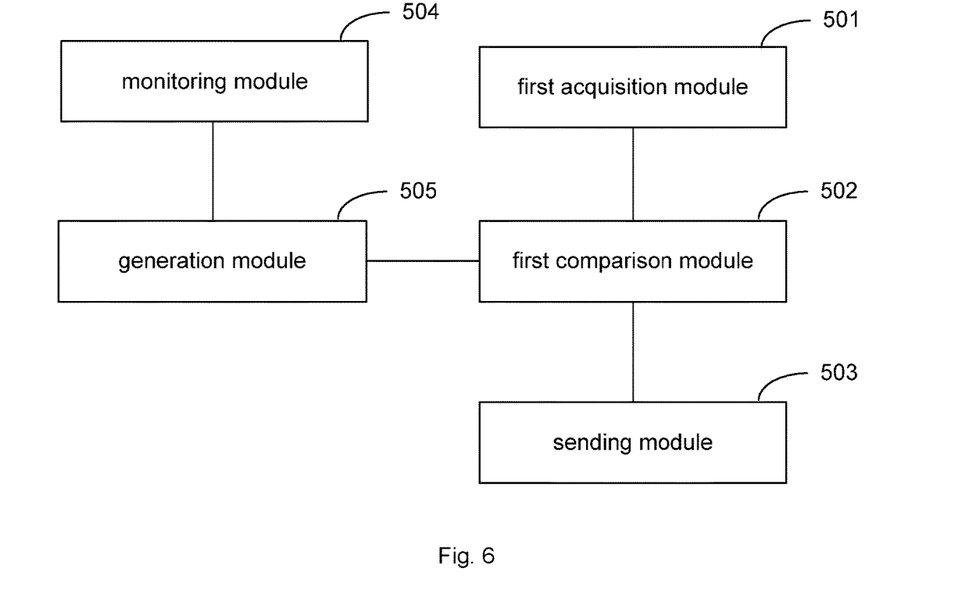
FIG. 6 is a block diagram of an air anomaly alarming device according to another exemplary embodiment.

In an embodiment, as shown in FIG. 6, the device further includes: a monitoring module 504 and a generation module 505.

The monitoring module 504 is configured to continuously monitor the air composition information of the indoor environment within a preset time period.

The generation module 505 is configured to generate the air change pattern according to the continuously monitored air composition information of the indoor environment.

Figure 7:
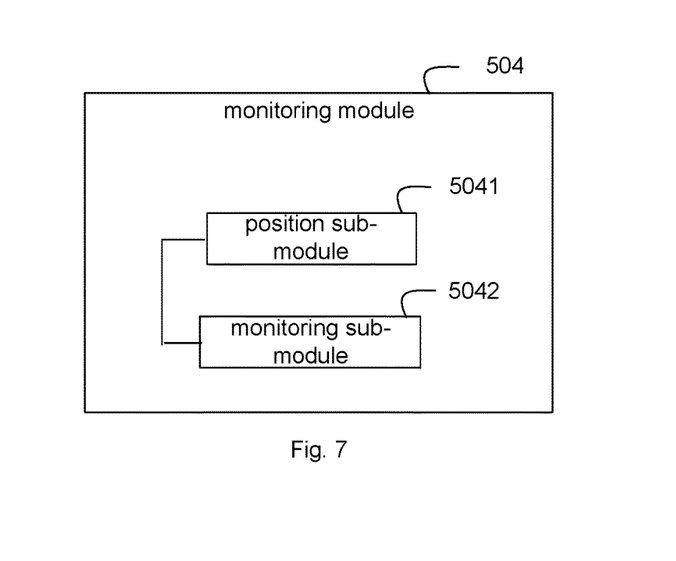
FIG. 7 is a block diagram of a monitoring module according to an exemplary embodiment.

In an embodiment, as shown in FIG. 7, the monitoring module 504 includes: a position sub-module 5041 and a monitoring sub-module 5042.

The position sub-module 5041 is configured to monitor its own position change information.

The monitoring sub-module 5042 is configured to continuously monitor the air composition information of the indoor environment within the preset time period when the position change information is greater than a preset distance threshold value.

Figure 8:
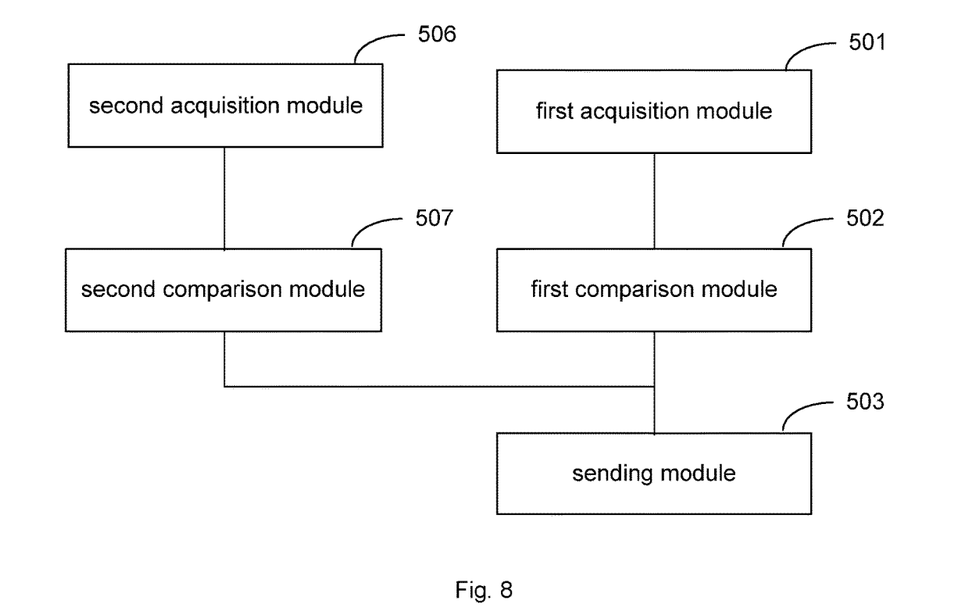
FIG. 8 is a block diagram of an air anomaly alarming device according to yet another exemplary embodiment.

In an embodiment, as shown in FIG. 8, the device further includes: a second acquisition module 506 and a second comparison module 507.

The second acquisition module 506 is configured to acquire air composition information of an outdoor environment.

The second comparison module 507 is configured to compare the air composition information of the indoor environment with the air composition information of the outdoor environment.

Figure 9:
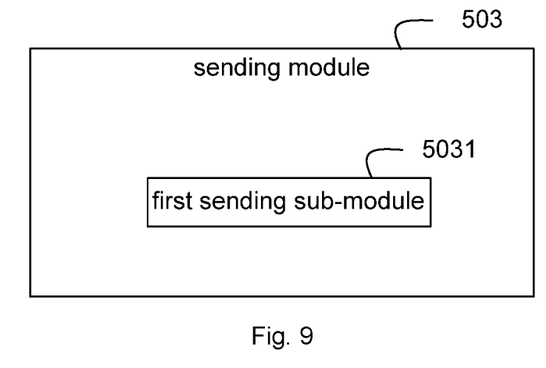
FIG. 9 is a block diagram of a sending module according to an exemplary embodiment.

As shown in FIG. 9, the sending module 503 includes: a first sending sub-module 5031.

The first sending sub-module 5031 is configured to send the alarming message to the preset target equipment when the difference between the air composition information of the indoor environment and the corresponding air composition information in the air change pattern is greater than the first preset air threshold value and a difference between the air composition information of the indoor environment and the air composition information of the outdoor environment is greater than a second preset air threshold value.

In an embodiment, the air composition information of the indoor environment may include at least two types of air composition information.

Figure 10:
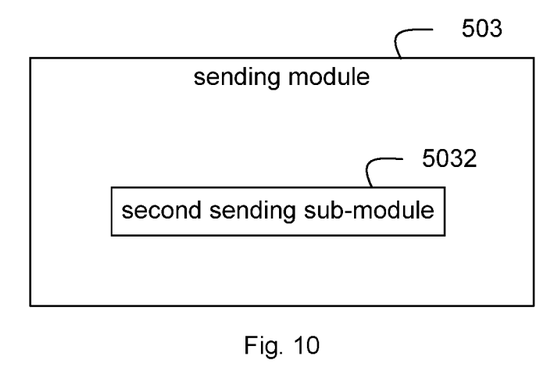
FIG. 10 is a block diagram of a sending module according to another exemplary embodiment.

As shown in FIG. 10, the sending module 503 includes: a second sending sub-module 5032.

The second sending sub-module 5032 is configured to, when a difference between at least one type of air composition information of the indoor environment and the corresponding air composition information in the air change pattern is greater than the first preset air threshold value, send the alarming message to preset target equipment corresponding to the at least one type of air composition information.

In an embodiment, the alarming message includes local position information.

With respect to the devices in the above embodiments, the specific manners for performing operations for individual modules therein have been described in detail in the embodiments regarding the methods, which will not be elaborated herein.

Figure 11:
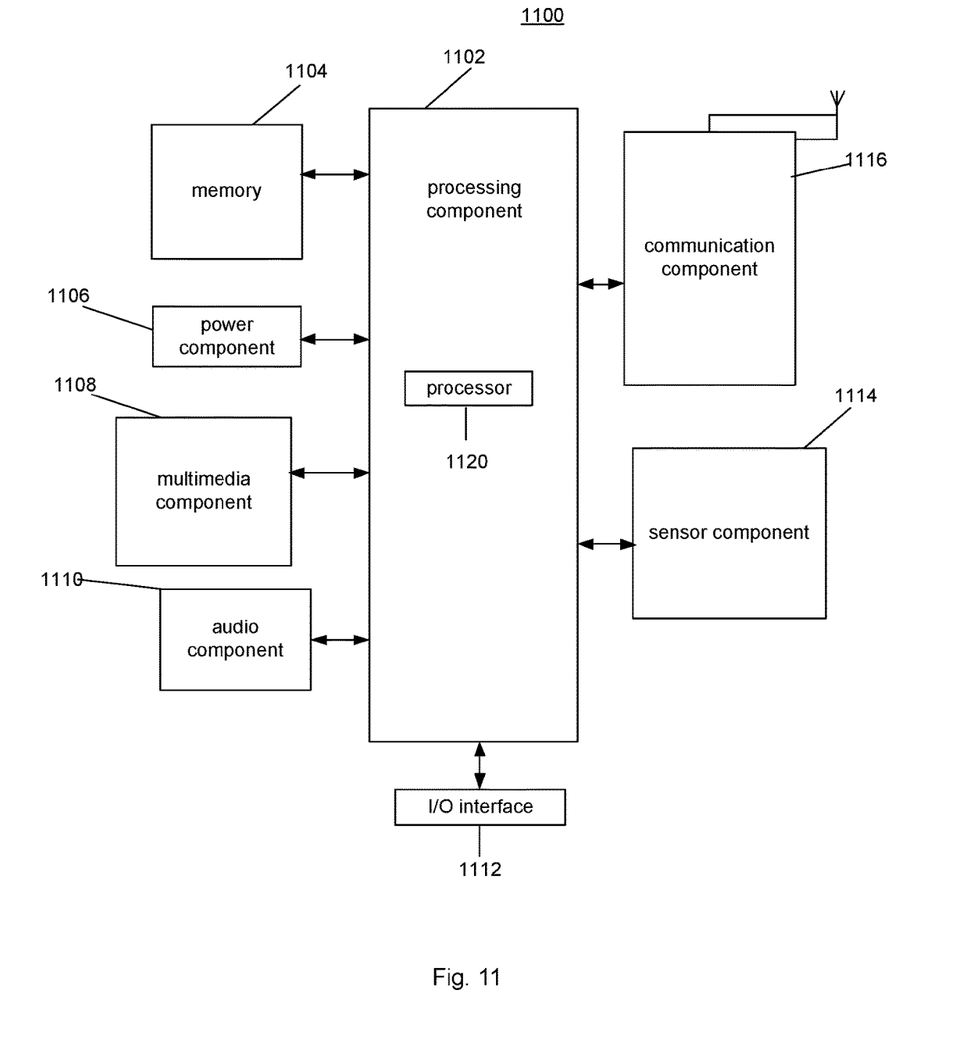
FIG. 11 is a block diagram of a device according to an exemplary embodiment.

FIG. 11 is a block diagram of an air anomaly alarming device 1100 according to an exemplary embodiment. For example, the device 1100 may be equipment such as an air purifier.

Referring to FIG. 11, the device 1100 may include one or more of the following components: a processing component 1102, a memory 1104, a power component 1106, a multimedia component 1108, an audio component 1110, an Input/Output (I/O) interface 1112, a sensor component 1114, and a communication component 1116.

The processing component 1102 typically controls overall operations of the device 1100, such as the operations associated with display, telephone calls, data communications, camera operations, and recording operations. The processing component 1102 may include one or more processors 1120 to execute instructions to perform all or part of the steps in the abovementioned method. Moreover, the processing component 1102 may include one or more modules which facilitate interaction between the processing component 1102 and the other components. For instance, the processing component 1102 may include a multimedia module to facilitate interaction between the multimedia component 1108 and the processing component 1102.

The memory 1104 is configured to store various types of data to support the operation of the device 1100. Examples of such data include instructions for any application programs or methods operated on the device 1100, contact data, phonebook data, messages, pictures, video, etc. The memory 1104 may be implemented by any type of volatile or non-volatile memory devices, or a combination thereof, such as a Static Random Access Memory (SRAM), an Electrically Erasable Programmable Read-Only Memory (EE-PROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1106 provides power for various components of the device 1100. The power component 1106 may include a power management system, one or more power supplies, and other components associated with the generation, management and distribution of power for the device 1100.

The multimedia component 1108 includes a screen providing an output interface between the device 1100 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also sense a duration and pressure associated with the touch or swipe action. In some embodiments, the multimedia component 1108 includes a front camera and/or a rear camera. The front camera and/or the rear camera may receive external multimedia data when the device 1100 is in an operation mode, such as a photographing mode or a video mode. Each of the front camera and the rear camera may be a fixed optical lens system or have focusing and optical zooming capabilities.

The audio component 1110 is configured to output and/or input an audio signal. For example, the audio component 1110 includes a Microphone (MIC), and the MIC is configured to receive an external audio signal when the device 1100 is in the operation mode, such as a call mode, a recording mode and a voice recognition mode. The received audio signal may be further stored in the memory 1104 or sent through the communication component 1116. In some embodiments, the audio component 1110 further includes a speaker configured to output the audio signal.

The I/O interface 1112 provides an interface between the processing component 1102 and a peripheral interface module, and the peripheral interface module may be a keyboard, a click wheel, a button and the like. The button may include, but not limited to: a home button, a volume button, a starting button and a locking button.

The sensor component 1114 includes one or more sensors configured to provide status assessment in various aspects for the device 1100. For instance, the sensor component 1114 may detect an on/off status of the device 1100 and relative positioning of components, such as a display and small keyboard of the device 1100, and the sensor component 1114 may further detect a change in a position of the device 1100 or a component of the device 1100, presence or absence of contact between the user and the device 1100, orientation or acceleration/deceleration of the device 1100 and a change in temperature of the device 1100. The sensor component 1114 may include a proximity sensor configured to detect presence of an object nearby without any physical contact. The sensor component 1114 may also include a light sensor, such as a Complementary Metal Oxide Semiconductor (CMOS) or Charge Coupled Device (CCD) image sensor, configured for use in an imaging application. In some embodiments, the sensor component 1114 may also include an acceleration sensor, a gyroscope sensor, a magnetic sensor, a pressure sensor or a temperature sensor.

The communication component 1116 is configured to facilitate wired or wireless communication between the device 1100 and another device. The device 1100 may access a communication-standard-based wireless network, such as a Wireless Fidelity (WiFi) network, a 2nd-Generation (2G) or 3rd-Generation (3G) network or a combination thereof. In an exemplary embodiment, the communication component 1116 receives a broadcast signal or broadcast associated information from an external broadcast management system through a broadcast channel. In an exemplary embodiment, the communication component 1116 further includes a Near Field Communication (NFC) module to facilitate short-range communication. For example, the NFC module may be implemented on the basis of a Radio Frequency Identification (RFID) technology, an Infrared Data Association (IrDA) technology, an Ultra-WideBand (UWB) technology, a BlueTooth (BT) technology and another technology.

In an exemplary embodiment, the device 1100 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary embodiment, there is also provided a non-transitory computer-readable storage medium including instructions, such as the memory 1104 including an instruction, and the instruction may be executed by the processor 1120 of the device 1100 to implement the abovementioned unlocking method. For example, the non-transitory computer-readable storage medium may be a ROM, a Compact Disc Read-Only Memory (CD-ROM), a magnetic tape, a floppy disc, an optical data storage device and the like.

An air anomaly alarming device includes: a processor; and a memory configured to store instructions executable by the processor, wherein the processor is configured to execute the air anomaly alarming method described above, the method including: acquiring air composition information of an indoor environment; comparing the air composition information of the indoor environment with corresponding air composition information in a pre-acquired air change pattern; and sending an alarming message to preset target equipment when a difference between the air composition information of the indoor environment and the corresponding air composition information in the air change pattern is greater than a first preset air threshold value.

The processor may further be configured as follows: the method further includes that: air composition information of the indoor environment is continuously monitored within a preset time period; and the air change pattern is generated according to the continuously monitored air composition information of the indoor environment.

The processor may further be configured as follows: the step that the air composition information of the indoor environment is continuously monitored within the preset time period includes that: own position change information is monitored; and the air composition information of the indoor environment is continuously monitored within the preset time period when the own position change information is greater than a preset distance threshold value.

The processor may further be configured as follows: the method further includes that: air composition information of an outdoor environment is acquired; the air composition information of the indoor environment is compared with the air composition information of the outdoor environment; and the step that the alarming message is sent to the preset target equipment when the difference between the air composition information of the indoor environment and the corresponding air composition information in the air change pattern is greater than the first preset air threshold value includes that: the alarming message is sent to the preset target equipment when the difference between the air composition information of the indoor environment and the corresponding air composition information in the air change pattern is greater than the first preset air threshold value and a difference between the air composition information of the indoor environment and the air composition information of the outdoor environment is greater than a second preset air threshold value.

The processor may further be configured as follows: the air composition information of the indoor environment may include at least two types of air composition information; and the step that the alarming message is sent to the preset target equipment when the difference between the air composition information of the indoor environment and the corresponding air composition information in the air change pattern is greater than the first preset air threshold value includes that: when a difference between at least one type of air composition information of the indoor environment and the corresponding air composition information in the air change pattern is greater than the first preset air threshold value, the alarming message is sent to preset target equipment corresponding to the at least one type of air composition information.

The processor may further be configured as follows: the alarming message includes local position information.

A non-transitory computer-readable storage medium having stored therein instructions is further disclosed, wherein the instructions, when executed by a processor of a mobile terminal, cause the mobile terminal to execute an air anomaly alarming method, the method including that: air composition information of an indoor environment is acquired; the air composition information of the indoor environment is compared with corresponding air composition information in a pre-acquired air change pattern; and an alarming message is sent to preset target equipment when a difference between the air composition information of the indoor environment and the corresponding air composition information in the air change pattern is greater than a first preset air threshold value.

The instruction in the storage medium may further include that: the method further includes that: air composition information of the indoor environment is continuously monitored within a preset time period; and the air change pattern is generated according to the continuously monitored air composition information of the indoor environment.

The instruction in the storage medium may further include that: the step that the air composition information of the indoor environment is continuously monitored within the preset time period includes that: own position change information is monitored; and the air composition information of the indoor environment is continuously monitored within the preset time period when the own position change information is greater than a preset distance threshold value.

The instruction in the storage medium may further include that: the method further includes that: air composition information of an outdoor environment is acquired; the air composition information of the indoor environment is compared with the air composition information of the outdoor environment; and the step that the alarming message is sent to the preset target equipment when the difference between the air composition information of the indoor environment and the corresponding air composition information in the air change pattern is greater than the first preset air threshold value includes that: the alarming message is sent to the preset target equipment when the difference between the air composition information of the indoor environment and the corresponding air composition information in the air change pattern is greater than the first preset air threshold value and a difference between the air composition information of the indoor environment and the air composition information of the outdoor environment is greater than a second preset air threshold value.

The instruction in the storage medium may further include that: the air composition information of the indoor environment may include at least two types of air composition information; and the step that the alarming message is sent to the preset target equipment when the difference between the air composition information of the indoor environment and the corresponding air composition information in the air change pattern is greater than the first preset air threshold value includes that: when a difference between at least one type of air composition information of the indoor environment and the corresponding air composition information in the air change pattern is greater than the first preset air threshold value, the alarming message is sent to preset target equipment corresponding to the at least one type of air composition information.

The instruction in the storage medium may further include that: the alarming message includes local position information.

Figure 12:
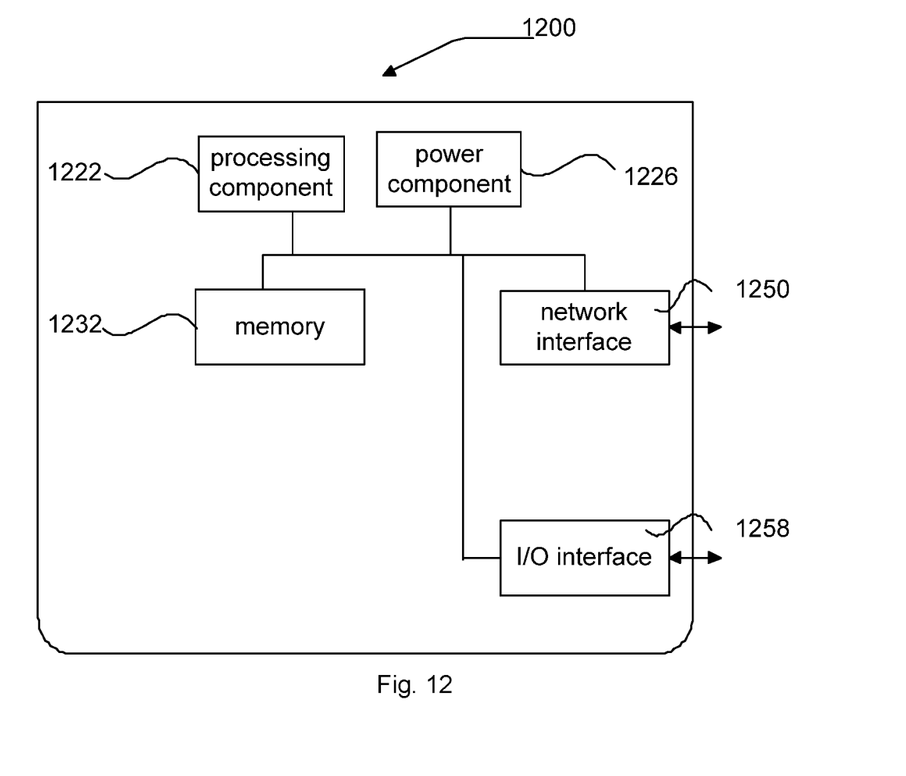
FIG. 12 is a block diagram of a device according to another exemplary embodiment.

FIG. 12 is a block diagram of an air anomaly alarming device 1200 according to an exemplary embodiment. For example, the device 1200 may be provided as equipment such as an air purifier. Referring to FIG. 12, the device 1200 includes a processing component 1222, which further includes one or more processors, and a memory resource represented by a memory 1232 configured to store instructions executable by the processing component 1222, such as application programs. The application programs stored in the memory 1232 may include one or more than one module of which each corresponds to a set of instructions. In addition, the processing component 1222 is configured to execute the instructions, so as to execute the abovementioned method.

The device 1200 may further include a power component 1226 configured to execute power management of the device 1200, a wired or wireless network interface 1250 configured to connect the device 1200 to a network, and an I/O interface 1258. The device 1200 may be operated on the basis of an operating system stored in the memory 1232, such as Windows Server™, Mac OS X™, Unix™, Linux™ or FreeBSD™.

Other embodiments of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

INDUSTRIAL APPLICABILITY

In the embodiment, when it is detected that indoor air obviously exceeds a general pattern, an indoor air anomaly is determined, and an alarm is given, so that timely detection and timely alarming of the air anomaly are implemented.

In the embodiment, the air composition information of the indoor environment is monitored in advance within a certain time period to generate the air change pattern as a subsequent determination basis about whether the indoor air is abnormal, so that whether the indoor air is abnormal may be determined more accurately.

In the embodiment, if a position of the equipment changes, a surrounding indoor environment changes, and air composition information of the indoor environment is re-monitored to re-generate an air change pattern, so that whether air in the new indoor environment is abnormal may be accurately monitored.

In the embodiment, the air composition information of the outdoor environment may also be acquired, and given influence of the outdoor environment on the indoor environment, both indoor and outdoor factors are taken into consideration to determine whether the indoor air is abnormal, so that a determination result is more accurate.

In the embodiment, the air composition information may also be subdivided, so that it is possible to accurately determine a cause for the air anomaly and pertinently give an alarm.

In the embodiment, the position information may also be sent to the target equipment to timely and accurately perform alarming processing.

What is claimed is:

1. An air anomaly alarming method, comprising:
   acquiring air composition information of an indoor environment;
   comparing the air composition information of the indoor environment with corresponding air composition information in a pre-acquired air change pattern; and
   sending an alarming message to preset target equipment when a difference between the air composition information of the indoor environment and the corresponding air composition information in the air change pattern is greater than a first preset air threshold value;
   wherein pre-acquisition of the air change pattern comprises:
      monitoring the air composition information of the indoor environment continuously within a preset time period; and
      generating the air change pattern according to the continuously monitored air composition information of the indoor environment;
   wherein the air change pattern comprises a set of air composition information changing with time.

2. The air anomaly alarming method according to claim 1, wherein monitoring the air composition information of the indoor environment continuously within the preset time period comprises:
   monitoring position change information; and
   monitoring the air composition information of the indoor environment continuously within the preset time period when the position change information is greater than a preset distance threshold value.

3. The air anomaly alarming method according to claim 1, further comprising:
   acquiring air composition information of an outdoor environment; and
   comparing the air composition information of the indoor environment with the air composition information of the outdoor environment,
   wherein sending the alarming message to the preset target equipment when the difference between the air composition information of the indoor environment and the corresponding air composition information in the air change pattern is greater than the first preset air threshold value comprises:
  sending the alarming message to the preset target equipment when the difference between the air composition information of the indoor environment and the corresponding air composition information in the air change pattern is greater than the first preset air threshold value and a difference between the air composition information of the indoor environment and the air composition information of the outdoor environment is greater than a second preset air threshold value.

4. The air anomaly alarming method according to claim 1, wherein the air composition information of the indoor environment comprises at least two types of air composition information; and
  sending the alarming message to the preset target equipment when the difference between the air composition information of the indoor environment and the corresponding air composition information in the air change pattern is greater than the first preset air threshold value comprises:
  sending the alarming message to preset target equipment corresponding to at least one type of air composition information when a difference between the at least one type of air composition information of the indoor environment and the corresponding air composition information in the air change pattern is greater than the first preset air threshold value.

5. The air anomaly alarming method according to claim 1, wherein the alarming message comprises local position information.

6. The air anomaly alarming method according to claim 1, wherein sending an alarming message to preset target equipment when a difference between the air composition information of the indoor environment and the corresponding air composition information in the air change pattern is greater than a first preset air threshold value comprises at least one of:
  when the air composition information is air composition information of harmful air, and when the air composition information of the indoor environment is greater than the corresponding air composition information in the pre-acquired air change pattern and the difference is greater than the first preset air threshold value, sending the alarming message to the preset target equipment; or
  when the air composition information is air composition information of beneficial air, and when the air composition information of the indoor environment is less than the corresponding air composition information in the air change pattern and an absolute value of the difference is greater than the first preset air threshold value, sending the alarming message to the preset target equipment.

7. An air anomaly alarming device, comprising:
  a processor; and
  a memory configured to store instructions executable by the processor,
  wherein the processor is configured to:
  acquire air composition information of an indoor environment;
  compare the air composition information of the indoor environment with corresponding air composition information in a pre-acquired air change pattern; and
  send an alarming message to preset target equipment when a difference between the air composition information of the indoor environment and the corresponding air composition information in the air change pattern is greater than a first preset air threshold value;
  wherein in order to pre-acquire the air change pattern, the processor is further configured to:
  monitor the air composition information of the indoor environment continuously within a preset time period; and
  generate the air change pattern according to the continuously monitored air composition information of the indoor environment;
  wherein the air change pattern comprises a set of air composition information changing with time.

8. The device according to claim 7, wherein the processor configured to monitor the air composition information of the indoor environment continuously within the preset time period is further configured to:
  monitor position change information; and
  monitor the air composition information of the indoor environment continuously within the preset time period when the position change information is greater than a preset distance threshold value.

9. The device according to claim 7, wherein the processor is further configured to:
  acquire air composition information of an outdoor environment; and
  compare the air composition information of the indoor environment with the air composition information of the outdoor environment,
  wherein the processor configured to send the alarming message to the preset target equipment when the difference between the air composition information of the indoor environment and the corresponding air composition information in the air change pattern is greater than the first preset air threshold value is further configured to:
  send the alarming message to the preset target equipment when the difference between the air composition information of the indoor environment and the corresponding air composition information in the air change pattern is greater than the first preset air threshold value and a difference between the air composition information of the indoor environment and the air composition information of the outdoor environment is greater than a second preset air threshold value.

10. The device according to claim 7, wherein the air composition information of the indoor environment comprises at least two types of air composition information; and
  the processor configured to send the alarming message to the preset target equipment when the difference between the air composition information of the indoor environment and the corresponding air composition information in the air change pattern is greater than the first preset air threshold value is further configured to:
  send the alarming message to preset target equipment corresponding to at least one type of air composition information when a difference between the at least one type of air composition information of the indoor environment and the corresponding air composition information in the air change pattern is greater than the first preset air threshold value.

11. The device according to claim 7, wherein the alarming message comprises local position information.

12. A non-transitory computer-readable storage medium having stored therein instructions that, when executed by a processor, causes the processor to perform an air anomaly alarming method, the method comprising:

acquiring air composition information of an indoor environment;

comparing the air composition information of the indoor environment with corresponding air composition information in a pre-acquired air change pattern; and sending an alarming message to preset target equipment when a difference between the air composition information of the indoor environment and the corresponding air composition information in the air change pattern is greater than a first preset air threshold value;

wherein pre-acquisition of the air change pattern comprises:

monitoring the air composition information of the indoor environment continuously within a preset time period; and generating the air change pattern according to the continuously monitored air composition information of the indoor environment;

wherein the air change pattern comprises a set of air composition information changing with time.

13. The non-transitory computer-readable storage medium according to claim 12, wherein monitoring the air composition information of the indoor environment continuously within the preset time period comprises:

monitoring position change information; and monitoring the air composition information of the indoor environment continuously within the preset time period when the position change information is greater than a preset distance threshold value.

14. The non-transitory computer-readable storage medium according to claim 12, wherein the method further comprises:

acquiring air composition information of an outdoor environment; and comparing the air composition information of the indoor environment with the air composition information of the outdoor environment, wherein sending the alarming message to the preset target equipment when the difference between the air composition information of the indoor environment and the corresponding air composition information in the air change pattern is greater than the first preset air threshold value comprises:

sending the alarming message to the preset target equipment when the difference between the air composition information of the indoor environment and the corresponding air composition information in the air change pattern is greater than the first preset air threshold value and a difference between the air composition information of the indoor environment and the air composition information of the outdoor environment is greater than a second preset air threshold value.

15. The non-transitory computer-readable storage medium according to claim 12, wherein the air composition information of the indoor environment comprises at least two types of air composition information; and sending the alarming message to the preset target equipment when the difference between the air composition information of the indoor environment and the corresponding air composition information in the air change pattern is greater than the first preset air threshold value comprises:

sending the alarming message to preset target equipment corresponding to at least one type of air composition information when a difference between the at least one type of air composition information of the indoor environment and the corresponding air composition information in the air change pattern is greater than the first preset air threshold value.

16. The non-transitory computer-readable storage medium according to claim 12, wherein the alarming message comprises local position information.

* * * * *